Patented Sept. 5, 1939

2,172,211

UNITED STATES PATENT OFFICE 2,172,211

BAKERY PRODUCT

Robert L. Lloyd, Laurelton, N. Y., assignor to American Maize-Products Company, a corporation of Maine No Drawing. Application January 19, 1938, Serial No. 185,651

4 Claims. (Cl. 99—92)

My invention relates to the preparation of doughs for bakery products and more particularly to short doughs for piecrust using an improved form of cereal sugars produced from corn as one of the ingredients in the dough.

A short dough which is the type of dough normally used for pie crust and similar bakery products contains shortening as a major ingredient. The amount of shortening is second only to flour in proportion to the total weight of all of the ingredients employed in the dough. A typical short dough is composed of flour, shortening, water, salt and supplementary ingredients such as eggs, milk, and cane sugar or dextrose or other similar carbohydrate materials. These supplementary ingredients have as their primary function the production of color in the finished product. While they serve this purpose more or less satisfactorily, they are subject to certain defects such as the following.

When cane sugar or dextrose is employed to obtain color, there appears in the bakery product such as pie crust, a noticeable porosity and also an unevenness of baking. The porosity which is apparently induced by use of the sucrose or dextrose is undesirable since it permits the crust to absorb moisture from the filling and thereby considerably shortens the sales life of the pie or similar edible product.

When milk powder is employed in short doughs the baker product is also subject to too great a porosity. Furthermore there results a noticeable toughening of the dough and an excessive shrinkage in volume, the flake is reduced and the cost of the product is proportionately increased.

In addition to the supplemental products mentioned above, starch may also be employed in the production of short doughs for pie crust and the like and while its use may contribute color it is advantageous only where it becomes necessary to modify the character of the flour used. For example, starch may be added to a high protein flour to reduce the protein to a more desirable percentage.

In the preparation of short doughs by conventional methods one or a combination of the following steps is normally used.

a. All the flour and shortening are mixed together for a stipulated period of time.

b. Part of the flour and all of the shortening are creamed, and the remainder of the flour added later.

c. The shortening and part of the water are whipped and the flour then added.

d. The shortening and part of the water are heated together and then this mixture added to the flour.

The supplementary ingredients are then added to the flour and shortening mixture prepared as above, in practically any desired manner.

The cereal sugars from corn that particularly characterize my invention are in the form of a dried solid starch conversion product which may be produced according to any of the processes disclosed in the copending applications Ser. Nos. 196,899, filed March 19, 1938; 197,423, filed March 22, 1938, and 163,257, filed Sept. 10, 1937. This dried product in its chemical composition resembles the commercial glucose commonly known as corn syrup, while in its physical state it is not a liquid but a fine white powder resembling powdered sugar. Because of this physical characteristic it can be easily and intimately admixed with the dry flour. One example of the cereal sugars produced from corn that I found advantageous to use contains roughly on a dry basis about 40.5% maltose, 11.5% dextrose and 48.0% dextrin. The reducing sugar value of this material calculated as dextrose on a dry weight basis is approximately 42%. It is to be understood, however, that the reducing sugar content calculated as dextrose may vary over a wide range for this dry solid cereal sugars product. For example, the dried cereal sugars product might be a direct starch conversion product or a blend of various conversion products having a reducing sugar content calculated as dextrose of approximately 30% to 60%. Also mixtures of low converted and high converted products ranging up to about 60% reducing sugar value calculated as dextrose may also be used. These and similar products and their processes of manufacture are fully disclosed in the above mentioned copending applications.

In preparing the bakery products of my invention I have found it advantageous to add the new supplementary ingredient namely, cereal sugars from corn, to the dry flour or a substantial portion thereof and intimately admix the flour with this sugar product before the shortening and other ingredients are added.

When using the dried cereal sugars product, described above, in short doughs in accordance with my present invention, a number of unexpected and commercially valuable properties in the finished baked products are obtained, such as for example the following:

The amount of shortening normally required in preparation of short doughs may be substantially reduced when the dried cereal sugars product is used instead of the usual sucrose or dextrose. It is believed that this is made possible by a more perfect distribution of the shortening throughout the admixture of flour and dried cereal sugars product than is normally obtained when the shortening is mixed with the flour alone and then the conventional sugars or other supplementary color forming materials added.

The dried cereal sugars from corn used in the present invention have the property of carmelizing at a lower temperature than any of the basic or supplementary ingredients heretofore used. This results in a more uniform color and a greater evenness in baking properties. One of the most unique effects obtained with this new supplementary material is that the color or browning of the dough in the baked product is evident throughout the entire thickness of the baked product. This is in contrast to the result normally obtained heretofore, especially in that portion of the crust next to the pie or other filling, which remains uncolored and unbaked. Pie crust made from doughs in which the dried cereal sugars are used, is brown and baked next to the filling as well as throughout the entire mass of the crust.

Another advantage of crust prepared from doughs using the improved cereal sugars from corn is that they do not take up moisture from the filling as rapidly as a crust without this ingredient. Also when this cereal sugars ingredient is used a shorter baking time at a lower temperature is made possible. This prevents the filling from boiling and running out of the pie as often occurs when the conventional form of pie crust is being prepared.

Because of the increased dryness and increased resistance to moisture absorption of the bakery products of my invention, they have a substantially improved edible quality and a longer sales life.

A satisfactory procedure for preparing short doughs using as an ingredient therein the cereal sugars from corn, in accordance with my invention, is as follows: Flour of a type normally used for preparing pie crust is blended thoroughly in dry form with the dry cereal sugars. When an intimate admixture of these ingredients has been obtained the shortening is then rubbed in, and finally salt dissolved in water is added to this mixture to form a dough of the proper consistency. These ingredients may be used for example, in the following proportions:

| | | |
|---|---|---|
| Dried cereal sugars from corn | lb | 1 |
| Flour | lbs | 10 |
| Shortening | lbs | 5 |
| Water | lbs | 3 |
| Salt | ozs | 5 |

It will be understood of course that this formula will not meet the specific requirements of every bakery and that the proportions of the several ingredients may be changed according to individual plant requirements. Variations in the amounts of all of the other ingredients for example, more or less flour, shortening, water and salt, may be employed without affecting the useful function of the dried cereal sugars.

It will be understood that the term "Cereal sugars from corn" as used in the specification and claims herein, is not restricted to any one specific starch conversion product of definite dextrose content, but covers any and all of the dried solid starch conversion products disclosed in the above mentioned co-opending applications including those made by direct conversion and drying and those made by blending of various conversion products.

The term "unleavened" as used in the claims herein is used in the conventional sense to designate a type of bakery product that has not been raised or substantially increased in volume by means of leavening agents such as are normally used in bread making. Illustrative but non-limiting examples of the unleavened bakery products made in accordance with this invention are, pie crusts and various forms of thin crackers.

Various modifications and changes may be made in the foregoing products and processes without departing from the scope of my invention, some of the novel features of which are defined in the appended claims.

I claim:

1. In a short, unleavened, bakery composition containing flour and a relatively large amount of shortening, a substantially dry, comminuted, solidified starch conversion syrup having a reducing sugars content calculated as dextrose of about 30% to 60% and the remainder principally dextrins, said solidified syrup having the property of carmelizing at a lower temperature than any of the other ingredients in the composition and imparting to the bakery product made therefrom substantially greater uniformity in browning throughout said product and substantially greater resistance to moisture absorption by said product from bakery fillings than such product made without said solidified syrup and such products made with sucrose or dextrose.

2. The improved bakery composition as defined in claim 1, in which the solidified syrup used is substantially dry, comminuted solidified corn syrup, which effects intimate and uniform admixture of the flour, shortening and solidified syrup.

3. A bakery composition for short pie crusts comprising a mixture of flour, a relatively large amount of shortening and at least about 5% of substantially dry, comminuted, solidified corn starch conversion syrup which consists predominantly of dextrose, maltose and dextrins the proportions of which vary in accordance with the degree of conversion of the corn syrup and the amount of maltose and dextrose ranging from an appreciable minimum amount up to about 60%, said composition being characterized by providing in the pie crusts produced therefrom a relatively high degree of shortness, a uniform browning and high resistance to moisture absorption.

4. In a bakery composition for making unleavened bakery products an intimate admixture of flour and a dried, solidified, comminuted, starch conversion syrup composed essentially of dextrose, maltose and dextrins, said dextrose and maltose being present in an amount ranging from an appreciable minimum amount up to about 60%, said admixture being characterized by a facility for thorough uniform blending with shortening and by imparting to the unleavened bakery product a relatively high degre of shortness, a uniform browning and high resistance to moisture absorption.

ROBERT L. LLOYD.